(12) United States Patent
Gidman et al.

(10) Patent No.: US 9,135,095 B2
(45) Date of Patent: Sep. 15, 2015

(54) METHODS AND SYSTEMS FOR INTER-APPLICATION COMMUNICATION

(71) Applicant: Loomis Sayles & Company, L.P., Boston, MA (US)

(72) Inventors: John Gidman, Hull, MA (US); Christian Dietz, Scituate, MA (US)

(73) Assignee: Loomis Sayles & Company, L.P., Boston, MA (US)

( * ) Notice: Subject to any disclaimer, the term of this patent is extended or adjusted under 35 U.S.C. 154(b) by 0 days.

(21) Appl. No.: 13/833,493

(22) Filed: Mar. 15, 2013

(65) Prior Publication Data

US 2014/0223449 A1 Aug. 7, 2014

Related U.S. Application Data

(60) Provisional application No. 61/761,997, filed on Feb. 7, 2013.

(51) Int. Cl.
*G06F 3/00* (2006.01)
*G06F 9/44* (2006.01)
*G06F 9/46* (2006.01)
*G06F 13/00* (2006.01)
*G06F 9/54* (2006.01)

(52) U.S. Cl.
CPC ..................................... *G06F 9/546* (2013.01)

(58) Field of Classification Search
CPC ........................................................ G06F 9/542
USPC ............................................................ 719/313
See application file for complete search history.

(56) References Cited

U.S. PATENT DOCUMENTS

| 7,231,596 | B2 * | 6/2007 | Koren ........................... 715/210 |
| 8,458,596 | B1 * | 6/2013 | Malks et al. ................... 715/742 |
| 2007/0130541 | A1 * | 6/2007 | Louch et al. ................... 715/804 |
| 2008/0077936 | A1 | 3/2008 | Goel et al. |
| 2011/0088046 | A1 | 4/2011 | Guertler et al. |
| 2011/0238555 | A1 | 9/2011 | Rosenthal |
| 2012/0095956 | A1 | 4/2012 | Xiong et al. |
| 2012/0209839 | A1 | 8/2012 | Andrews et al. |

FOREIGN PATENT DOCUMENTS

EP    2 521 043    *  7/2012    ............. G06F 17/30

OTHER PUBLICATIONS

International Search Report and Written Opinion for PCT/2014/015090, dated Apr. 29, 2014.

* cited by examiner

*Primary Examiner* — Timothy A Mudrick
(74) *Attorney, Agent, or Firm* — Rajesh Vallabh; Foley Hoag LLP

(57) ABSTRACT

Methods and systems are provided for inter-application communication using messages posted on a bulletin board.

20 Claims, 7 Drawing Sheets

FIG. 4

METHODS AND SYSTEMS FOR INTER-APPLICATION COMMUNICATION

CROSS REFERENCE TO RELATED APPLICATION

This application claims priority from U.S. Provisional Application No. 61/761,997 filed on Feb. 7, 2013 entitled METHODS AND SYSTEMS FOR INTER-APPLICATION COMMUNICATION, which is hereby incorporated by reference.

BACKGROUND

The present application relates generally to methods and systems for communication among application programs running in a computer system.

BRIEF SUMMARY OF THE DISCLOSURE

In accordance with one or more embodiments a computer system is provided comprising at least one processor, memory associated with the at least one processor, and a plurality of application programs supported in the memory that can be executed by the at least one processor. Each of the application programs is capable of processing data and displaying data to a user of the computer system. At least one of the application programs is configured to post data on a bulletin board for use by another one of the application programs in response to a user input. At least one other application program is configured to (i) listen for data posted by another application program, (ii) determine if the data posted is semantically relevant, and (iii) when the data is determined to be semantically relevant to process the data and display results to the user.

A data processing method in accordance with one or more embodiments comprises the steps of (a) executing a plurality of application programs on a computer system, said application programs displaying data to a user; (b) receiving an input from the user comprising data posted by the user on a bulletin board from one of the application programs; (c) broadcasting the posted data to the plurality of application programs; (d) determining independently through each application program whether the posted data is semantically relevant to that application program; (e) when the data is determined to be semantically relevant to an application program, processing the posted data through the application program and displaying results to the user.

BRIEF DESCRIPTION OF THE DRAWINGS

Figure 4:
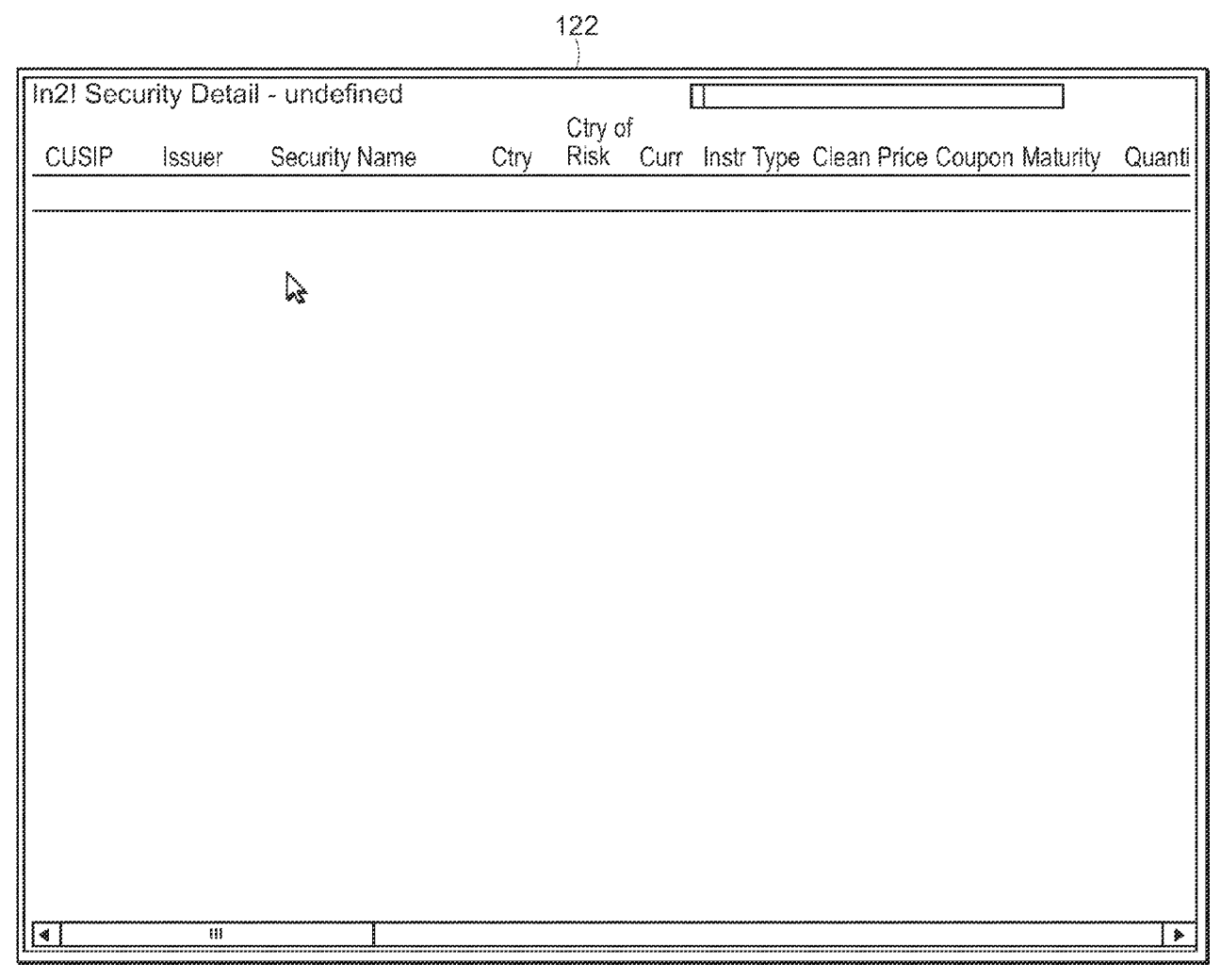

FIGS. 3-7 are screenshots illustrating an exemplary inter-application communication process in accordance with one or more embodiments.

DETAILED DESCRIPTION

Various embodiments disclosed herein are directed to methods and systems for enabling application programs executing on a computer system to share data with each other. The inter-application communication methods and systems can be applied to a wide variety of application programs. A computer system user can select a particular data item displayed by one application program and post the data item on a virtual bulletin board. Other application programs running on the computer system listen for posted data items. If an application program determines that a posted data item is relevant to that application program, it automatically imports and processes the data item and any needed other data associated with the data item.

The following is a simple example illustrating an inter-application communication process in accordance with one or more embodiments. A computer system operated by a user is running two applications: a spreadsheet application of accounts and held securities and a price chart application. The user can select a particular data item (e.g., an account or security) displayed by the spreadsheet application, and post the data item on a bulletin board. The price chart application, which listens for posted data items, determines whether the data posted is relevant to the price chart application. Relevance is determined based on whether the data is semantically relevant. For example, the chart program is configured to only act on semantic data having a specified description (e.g., an account or security). If the data is determined to be relevant, the chart application processes the data, e.g., by generating a chart from the data, which is then displayed to the user. In one exemplary implementation, each posted data item includes one or more type:value pairs (e.g., "Security": "IBM"). Each listening application can independently determine if the data item is relevant to it based on the data type and accordingly how best to react.

The inter-application communication system enables application developers to create complex software systems from a large number of relatively small and simple individual application programs. Users can select any particular combination of application programs to work together from many different possible combinations. Working with relatively small and simple individual application programs rather than larger and significantly more complex programs allows system developers to greatly increase the speed of software development. Also, support and maintenance costs can be reduced.

Figure 1:
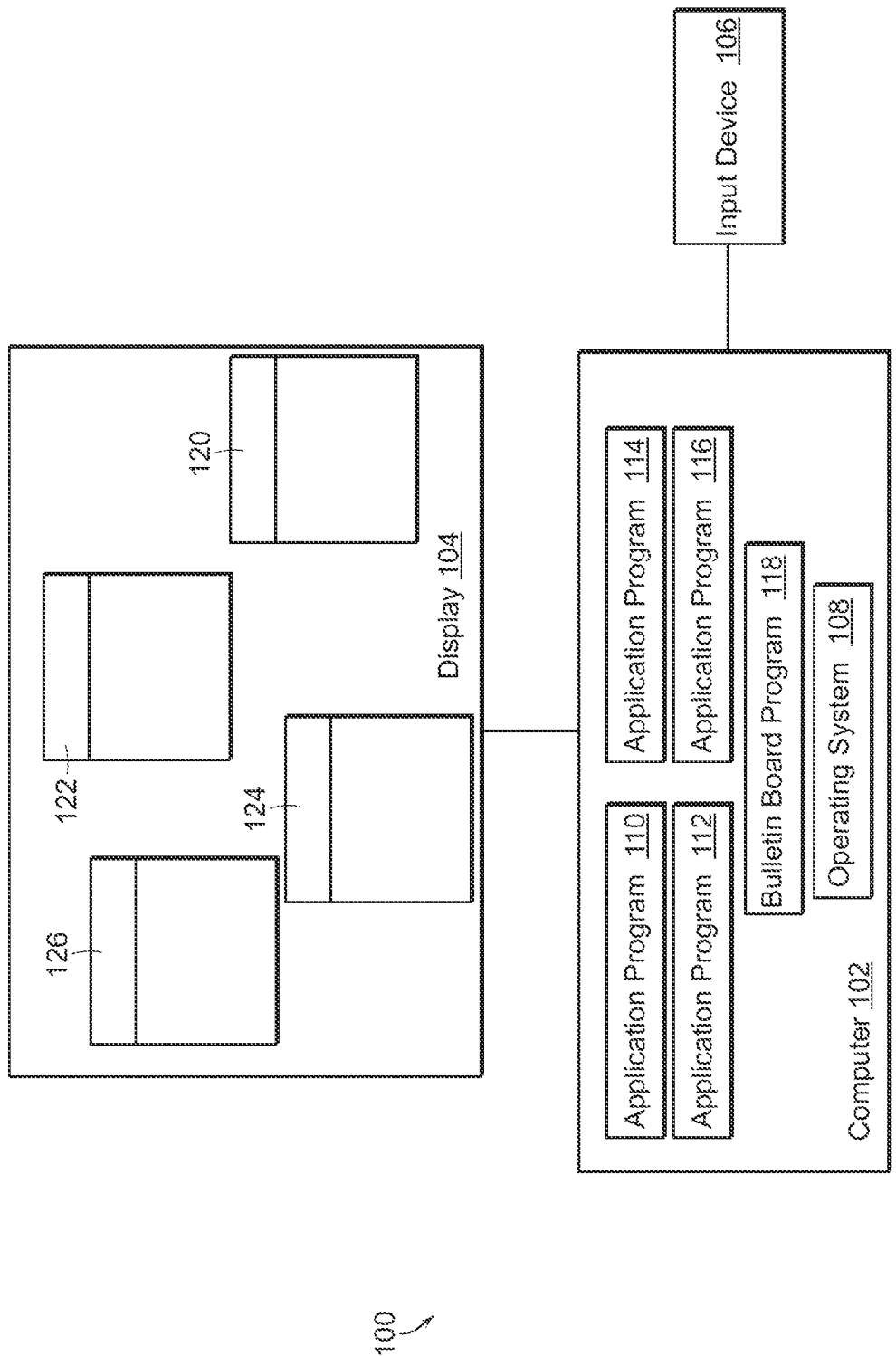
FIG. 1 is a schematic illustration of an exemplary inter-application communication system in accordance with one or more embodiments.

FIG. 1 is a simplified illustration of an exemplary inter-application communication system 100 in accordance with one or more embodiments. The system 100 includes a computer system 102 operatively coupled to a display 104 and one or more user input devices 106 (e.g., a keyboard or mouse). The computer system 102 includes an operating system 108, on which a plurality of application programs 110, 112, 114, 116 and a bulletin board application program 118 can be executed. In this example, the user has selected this combination of four applications 110, 112, 114, 116 from a larger set of available applications. The application programs 110, 112, 114, 116 generate windows or panes 120, 122, 124, 126, respectively, on the computer display 104.

The computer system 102 comprises any type of computing device or system capable of running application programs. The computer system 102 includes a user-operated device such as a personal computer (e.g., a desktop, notebook, or tablet computer), a workstation, a smart phone, or a personal digital assistant. The computer system 102 can also comprise one or more remote computers connected to the user-operated device over a communications network (e.g., the Internet, a local area network, a wide area network, a wireless network, a cellular network, or some combination thereof). The application programs can execute entirely on the user-operated device, partly on the user device and partly on the one or more remote computers, or entirely on the one or more remote computers.

Figure 2:
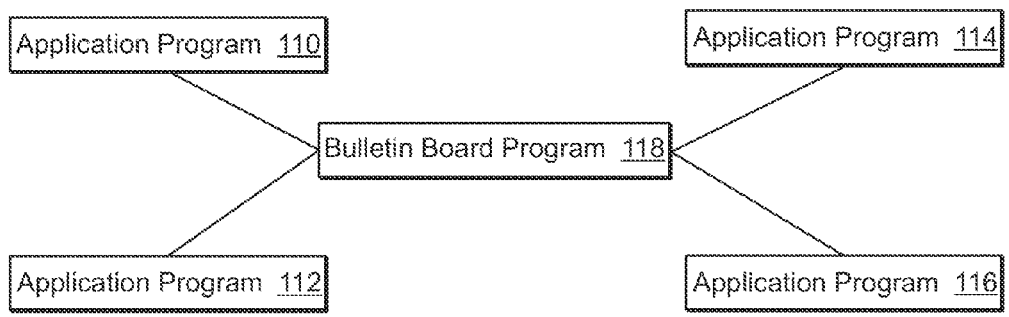
FIG. 2 is a schematic illustration of an exemplary computer software system used in the inter-application communication system of FIG. 1.
Figure 3:
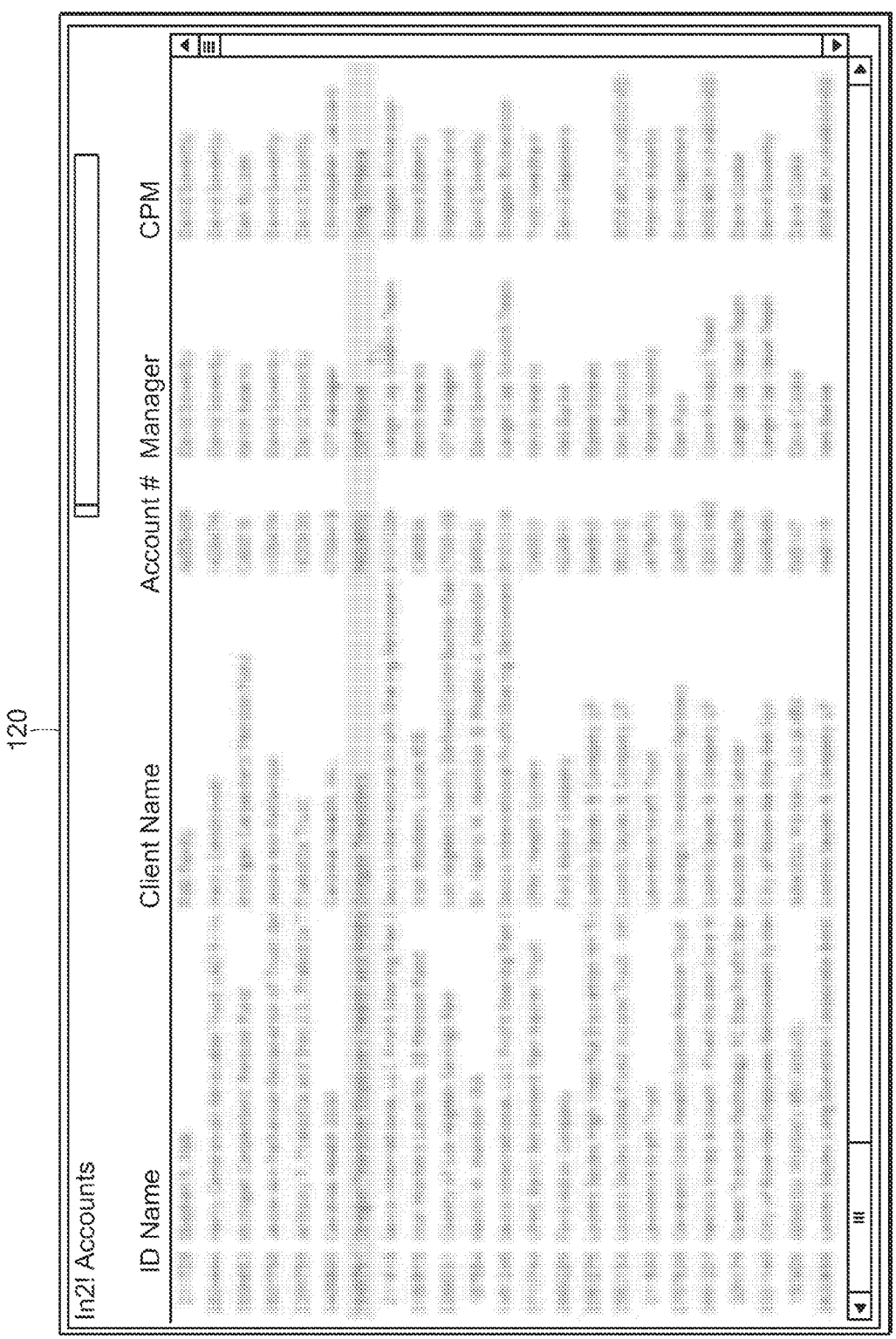
Figure 5:
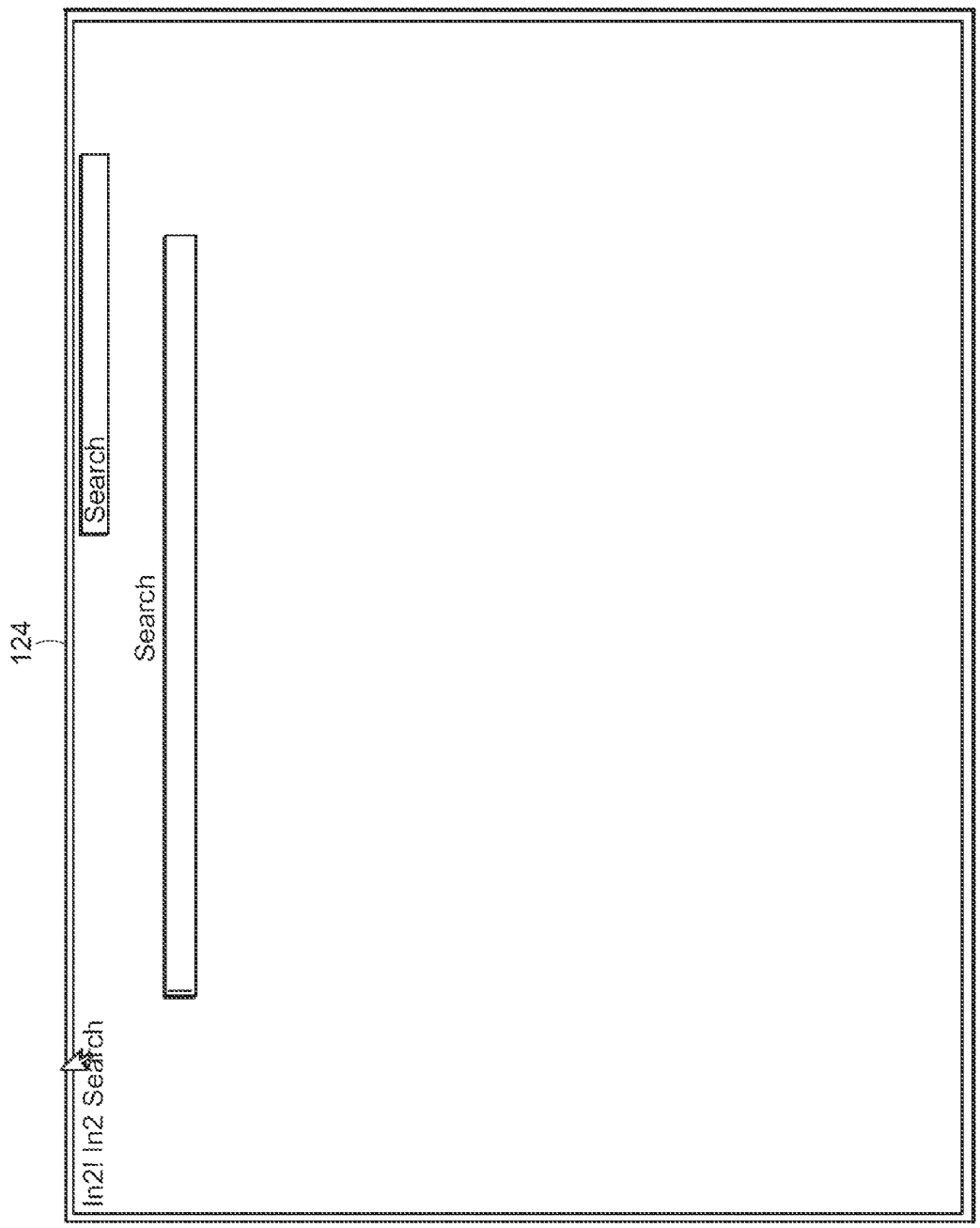
Figure 6:
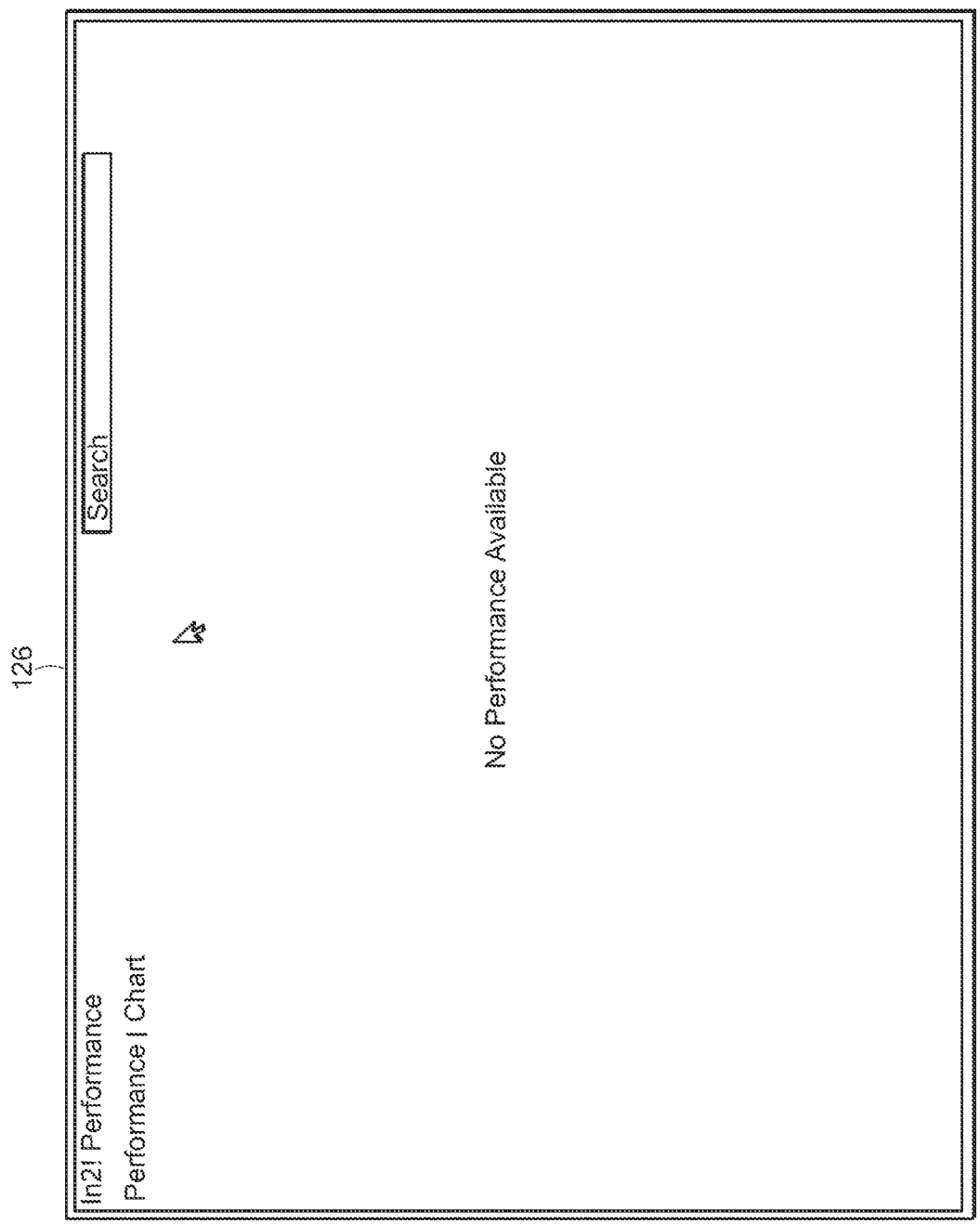

FIG. 2 is a simplified block diagram illustrating an example of a software architecture in accordance with one or more embodiments. Each of the application programs 110, 112, 114, 116 can communicate with each other through the bulletin board application program 118. Specifically, when a user posts a data item on the bulletin board from one application, the bulletin board application 118 receives the data item and broadcasts it to all the other applications running on the computer system 102. The other applications listen for posted data items. If they determine that the posted data item is relevant, they automatically import and process the data item (and any needed related data associated with the data item), and display the results to the user.

FIGS. 3-7 are screenshots illustrating exemplary use of the inter-application communication system for processing and displaying financial data. In this example, the user is running four application programs on a computer system: an "Accounts" application (shown in window 120 in FIG. 3), a "Security Detail" application (shown in window 122 in FIG. 4), a Search application (shown in window 124 in FIG. 5), and a "Performance Chart" application (shown in window 126 in FIG. 6).

The Accounts application (FIG. 3) lists various client accounts managed by the user or an organization. (Certain text in the screenshots is intentionally blurred.) The Security Detail application (FIG. 4) can display detailed information on particular financial securities held by a given client account. The Search application (FIG. 5) can be used to conduct a database search for additional information related to the data item. The Performance Chart application (FIG. 6) can generate and display a performance chart from client account data. The Security Detail, Search, and Performance Chart windows are blank because no data has yet been entered.

Figure 7:
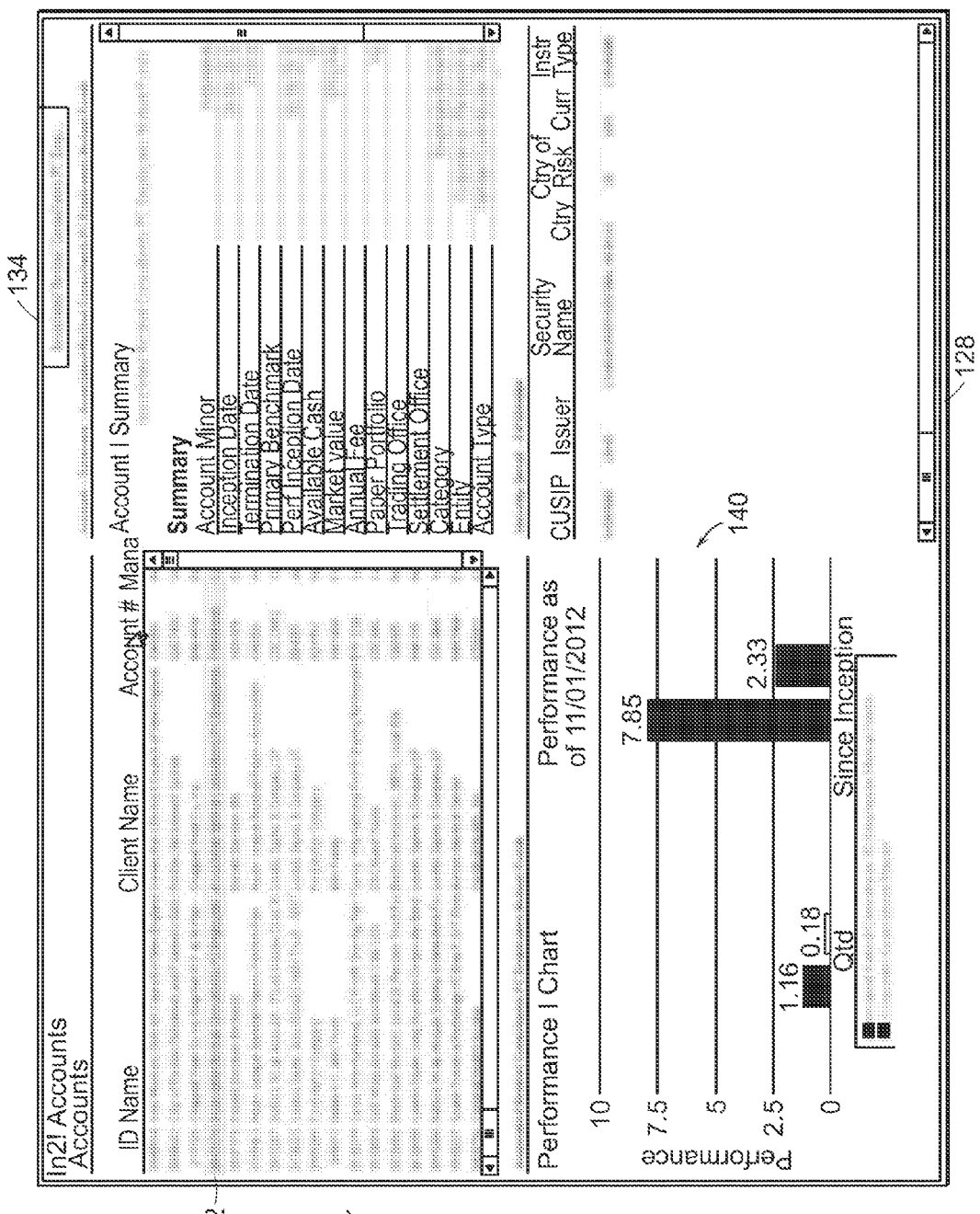

In accordance with one or more embodiments, the user first joins the four application programs before they can communicate with each other through the bulletin board. The applications can be joined by executing them in a single window 128 as shown in FIG. 7. In one or more embodiments, a user can join two applications by simply dragging one application window onto another application window. As shown in FIG. 7, all four applications have been joined in window 128, enabling them to communicate with one another.

The user then selects a data item from the data displayed in the Accounts section of the window 128. In this example, the user has selected a particular client account shown highlighted at 132 and posted the selected data in bulletin board 134. The Security Detail application, the Search application, and the Performance Chart application analyze the posted data item, determine that it is relevant, and accordingly import the data item (and any needed related data) and process and display the results as shown in FIG. 7. Specifically, the Search application retrieves additional account information related to the particular client account posted in the bulletin board and displays that information in area 136 of the window 128. The Securities Detail application retrieves information on each of the securities held in the posted client account and displays that information in area 138 of the window 128. In addition, the Performance Chart application generates a chart indicating performance of the posted client account and displays the results in area 140 of window 128.

Not all applications running in the computer system need to have the ability to both post data and listen for posted data. Some applications may have the ability to only post data. Some may only be able to listen for posted data, and some may be able to do neither.

The step of joining applications together before they can communicate with each other is optional. In some embodiments, any application that is active on the computer system can communicate with other active applications without being joined.

The inter-application communication system thereby enables users to very quickly and easily process information using a variety of combinations of different individual applications.

The processes of the inter-application communication system 100 described above may be implemented in software, hardware, firmware, or any combination thereof. The processes are preferably implemented in one or more computer programs executing on a programmable computer including a processor, a storage medium readable by the processor (including, e.g., volatile and non-volatile memory and/or storage elements), and input and output devices. Each computer program can be a set of instructions (program code) in a code module resident in the random access memory of the computer. Until required by the computer, the set of instructions may be stored in another computer memory (e.g., in a hard disk drive, or in a removable memory such as an optical disk, external hard drive, memory card, or flash drive) or stored on another computer system and downloaded via the Internet or other network.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions. For example, the computer system may comprise one or more physical machines, or virtual machines running on one or more physical machines. In addition, the computer system may comprise a cluster of computers or numerous distributed computers that are connected by the Internet or another network.

Accordingly, the foregoing description and attached drawings are by way of example only, and are not intended to be limiting.

What is claimed is:

1. A computer system, comprising:
   at least one processor;
   memory associated with the at least one processor; and
   a plurality of application programs supported in the memory that can be executed by the at least one processor, each of the application programs capable of processing data and displaying data to a user of the computer system, at least one of said application programs being configured to post data on a bulletin board for use by another one of said application programs in response to a user input, and wherein said another one of said application programs is configured to (i) listen for data posted by another application program, (ii) determine independently and for itself if the data posted is semantically relevant to said another one of said application programs, and (iii) when the data is determined to be semantically relevant to said another one of said application programs to process the data and display results to the user.

2. The system of claim 1, wherein one of said plurality of application programs includes a bulletin board program providing the bulletin board on which data is posted.

3. The system of claim 1, wherein the posted data includes one or more type:value pairs, and an application program listening for the data determines whether the data is semantically relevant based on the type specified.

4. The system of claim 1, wherein the plurality of application programs are selected from a larger group of available application programs.

5. The system of claim 1, wherein the application programs are configured such that windows generated by the application programs can be joined by the user to enable the application programs to communicate with each other through the bulletin board.

6. The system of claim 1, wherein the computer system comprises a user-operated device and one or more remote computers connected to the user-operated device over a communications network, and wherein the application programs execute entirely on the user-operated device, partly on the user-operated device and partly on the one or more remote computers, or entirely on the one or more remote computers.

7. The system of claim 1, wherein the data comprises financial data.

8. The system of claim 1, wherein a plurality of said application programs are configured to post data on a bulletin board for use by a plurality of other application programs in response to a user input, and wherein a plurality of application programs are each configured to (i) listen for data posted by another application program, (ii) determine independently if the data posted is semantically relevant to itself, and (iii) when the data is determined to be semantically relevant to process the data and display results to the user.

9. A data processing method, comprising the steps of:
(a) executing a plurality of application programs on a computer system, said application programs displaying data to a user;
(b) receiving an input from the user comprising data posted by the user on a bulletin board from one of the application programs;
(c) broadcasting the posted data to the plurality of application programs;
(d) determining independently through each of the plurality of application programs whether the posted data is semantically relevant to that application program;
(e) when the data is determined to be semantically relevant to an application program by the application program, processing the posted data through the application program and displaying results to the user.

10. The method of claim 9, wherein broadcasting the posted data comprises posting the data on a bulletin board.

11. The method of claim 9, wherein the posted data includes one or more type:value pairs, and data is determined to be semantically relevant based on the type specified.

12. The method of claim 9, further comprising providing a larger set of application programs from which the plurality of application programs are selected.

13. The method of claim 9, further comprising displaying to the user a window for each of the plurality of application programs, and receiving from the user and input to join application programs to enable the application programs to communicate with each other.

14. The method of claim 9, wherein the computer system comprises a user-operated device and one or more remote computers connected to the user-operated device over a communications network, and wherein the application programs execute entirely on the user-operated device, partly on the user-operated device and partly on the one or more remote computers, or entirely on the one or more remote computers.

15. The method of claim 9, wherein the data comprises financial data.

16. A computer program product residing on a non-transitory computer readable medium having a plurality of instructions stored thereon which, when executed by a computer processor, cause that computer processor to:
(a) execute a plurality of application programs on a computer system, said application programs displaying data to a user;
(b) receive an input from the user comprising data posted by the user on a bulletin board from one of the application programs;
(c) broadcast the posted data to the plurality of application programs;
(d) determine independently through each of the plurality of application programs whether the posted data is semantically relevant to that application program;
(e) when the data is determined to be semantically relevant to an application program by the application program, process the posted data through the application program and display results to the user.

17. The computer program product of claim 16, wherein (c) comprises post the data on a bulletin board.

18. The computer program product of claim 16, wherein the posted data includes one or more type:value pairs, and data is determined to be semantically relevant based on the type specified.

19. The computer program product of claim 16, wherein the instructions further cause the processor to display to the user a window for each of the plurality of application programs, and receive from the user and input to join application programs to enable the application programs to communicate with each other.

20. The computer program product of claim 16, wherein the data comprises financial data.

* * * * *